US012582166B2

(12) United States Patent
Blandino et al.

(10) Patent No.: US 12,582,166 B2
(45) Date of Patent: Mar. 24, 2026

(54) AEROSOL PROVISION DEVICE

(71) Applicant: NICOVENTURES TRADING LIMITED, London (GB)

(72) Inventors: Thomas Paul Blandino, Cottage Grove, WI (US); Richard John Hepworth, London (GB)

(73) Assignee: NICOVENTURES TRADING LIMITED, London (GB)

(*) Notice: Subject to any disclaimer, the term of this patent is extended or adjusted under 35 U.S.C. 154(b) by 1056 days.

(21) Appl. No.: 17/593,144

(22) PCT Filed: Mar. 9, 2020

(86) PCT No.: PCT/EP2020/056246
§ 371 (c)(1),
(2) Date: Sep. 10, 2021

(87) PCT Pub. No.: WO2020/182754
PCT Pub. Date: Sep. 17, 2020

(65) Prior Publication Data

US 2022/0183371 A1 Jun. 16, 2022

Related U.S. Application Data

(60) Provisional application No. 62/816,319, filed on Mar. 11, 2019.

(51) Int. Cl.
*A24F 40/465* (2020.01)
*A24F 40/42* (2020.01)
(Continued)

(52) U.S. Cl.
CPC ............ *A24F 40/465* (2020.01); *A24F 40/42* (2020.01); *A24F 40/57* (2020.01); *H05B 6/105* (2013.01)

(58) Field of Classification Search
CPC ........ A24F 40/465; A24F 40/20; A24F 40/80; A24F 40/90; A24F 40/50; H02J 7/007;
(Continued)

(56) References Cited

U.S. PATENT DOCUMENTS 5,649,554 A 7/1997 Sprinkel et al.
9,820,512 B2 11/2017 Mironov et al.
(Continued)

FOREIGN PATENT DOCUMENTS

CN 102803465 A 11/2012
CN 203762288 U 8/2014
(Continued)

OTHER PUBLICATIONS

"EP Office Action in European Appln No. 20714859.4 dated, Oct. 16, 2024", 9 pages.
(Continued)

*Primary Examiner* — Robert G Bachner
(74) *Attorney, Agent, or Firm* — Merchant & Gould P.C.

(57) ABSTRACT

An aerosol provision device is provided. The device comprises a receptacle configured to receive aerosol generating material, wherein the aerosol generating material is heatable by a susceptor. The device further comprises an inductor coil extending around the receptacle, wherein the inductor coil is configured to generate a varying magnetic field for heating the susceptor. The device further comprises a magnetic shield member extending at least partially around the inductor coil.

13 Claims, 10 Drawing Sheets

(51) Int. Cl.
*A24F 40/57* (2020.01)
*H05B 6/10* (2006.01)

(58) Field of Classification Search
CPC . H02J 7/007184; H05B 6/105; H05B 1/0202; H05B 6/06; H05B 6/36
See application file for complete search history.

(56) References Cited

U.S. PATENT DOCUMENTS

| | | | | |
|---|---|---|---|---|
| 10,028,535 | B2 | 7/2018 | Mironov | |
| 10,136,672 | B2 | 11/2018 | Minskoff et al. | |
| 10,159,283 | B2 | 12/2018 | Mironov | |
| 11,924,930 | B2 | 3/2024 | Wilke et al. | |
| 2015/0070233 | A1 | 3/2015 | Nakamura et al. | |
| 2015/0223292 | A1 | 8/2015 | Duffield et al. | |
| 2016/0064814 | A1* | 3/2016 | Jang | H05K 9/0075 174/377 |
| 2016/0120221 | A1 | 5/2016 | Mironov et al. | |
| 2017/0027233 | A1 | 2/2017 | Mironov | |
| 2017/0055574 | A1 | 3/2017 | Kaufman et al. | |
| 2017/0055575 | A1 | 3/2017 | Wilke et al. | |
| 2017/0055580 | A1 | 3/2017 | Blandino et al. | |
| 2017/0055583 | A1 | 3/2017 | Blandino et al. | |
| 2017/0079326 | A1* | 3/2017 | Mironov | H05B 6/108 |
| 2017/0079330 | A1 | 3/2017 | Mironov et al. | |
| 2017/0105452 | A1 | 4/2017 | Mironov et al. | |
| 2017/0119046 | A1 | 5/2017 | Kaufman et al. | |
| 2017/0119048 | A1 | 5/2017 | Kaufman et al. | |
| 2017/0202266 | A1 | 7/2017 | Sur | |
| 2018/0070639 | A1 | 3/2018 | Chen et al. | |
| 2018/0192700 | A1 | 7/2018 | Fraser et al. | |
| 2018/0192701 | A1 | 7/2018 | Stoner | |
| 2018/0242636 | A1 | 8/2018 | Blandino et al. | |
| 2018/0317554 | A1 | 11/2018 | Kaufman et al. | |
| 2019/0000149 | A1 | 1/2019 | Phillips et al. | |

FOREIGN PATENT DOCUMENTS

| | | | |
|---|---|---|---|
| CN | 105307526 | A | 2/2016 |
| CN | 206227716 | U | 6/2017 |
| CN | 206443211 | U | 8/2017 |
| CN | 107920602 | A | 4/2018 |
| CN | 108353520 | A | 7/2018 |
| CN | 208228310 | U | 12/2018 |
| CN | 208228311 | U | 12/2018 |
| CN | 109330030 | A | 2/2019 |
| EP | 2434836 | A2 | 3/2012 |
| EP | 3243395 | A2 | 11/2017 |
| EP | 3295813 | A1 | 3/2018 |
| EP | 3367828 | A1 | 9/2018 |
| JP | S63308080 | A | 12/1988 |
| JP | H0730281 | A | 1/1995 |
| JP | 2005024038 | A | 1/2005 |
| JP | 3771258 | B2 | 4/2006 |
| JP | 2015504670 | A | 2/2015 |
| JP | 2016528874 | A | 9/2016 |
| JP | 2018509627 | A | 4/2018 |
| JP | 2018528765 | A | 10/2018 |
| JP | 2018529322 | A | 10/2018 |
| JP | 2018529324 | A | 10/2018 |
| JP | 2018535660 | A | 12/2018 |
| JP | 2019501630 | A | 1/2019 |
| JP | 2019508632 | A | 3/2019 |
| KR | 20150143885 | A | 12/2015 |
| KR | 20180034640 | A | 4/2018 |
| KR | 20200099481 | A | 8/2020 |
| RU | 2016150117 | A | 6/2018 |
| RU | 2677086 | C2 | 1/2019 |
| UA | 115323 | C2 | 10/2017 |
| WO | 9527411 | A1 | 10/1995 |
| WO | 2015131058 | A1 | 9/2015 |
| WO | 2015175568 | A1 | 11/2015 |
| WO | 2015177253 | A1 | 11/2015 |
| WO | 2016149666 | A1 | 9/2016 |
| WO | 2017036950 | A2 | 3/2017 |
| WO | 2017068099 | A1 | 4/2017 |
| WO | 2017187389 | A1 | 11/2017 |
| WO | 2017194769 | A1 | 11/2017 |
| WO | 2018041450 | A1 | 3/2018 |
| WO | 2018073376 | A1 | 4/2018 |
| WO | 2018178095 | A1 | 10/2018 |
| WO | 2018178113 | A2 | 10/2018 |
| WO | 2018186156 | A1 | 10/2018 |
| WO | 2019030168 | A1 | 2/2019 |
| WO | 2019030364 | A1 | 2/2019 |

OTHER PUBLICATIONS

"International Preliminary Report on Patentability received for PCT Patent Application No. PCT/EP2020/056231, mailed on Sep. 23, 2021", 10 pages.
"International Preliminary Report on Patentability received for PCT Patent Application No. PCT/EP2020/056242, mailed on Sep. 23, 2021", 8 pages.
"International Preliminary Report on Patentability received for PCT Patent Application No. PCT/EP2020/056246, mailed on Sep. 23, 2021", 8 pages.
"International Search Report and Written Opinion received for PCT Patent Application No. PCT/EP2020/056231, mailed on Jul. 15, 2020", 11 pages.
"International Search Report and Written Opinion received for PCT Patent Application No. PCT/EP2020/056242, mailed on Jun. 22, 2020", 11 pages.
"International Search Report and Written Opinion received for PCT Patent Application No. PCT/EP2020/056246, mailed on Jun. 24, 2020", 10 pages.
"KR Office Action in Korean Application No. 10-2021-7028566 dated Oct. 26, 2024", 7 pages.
"Office Action received for Australian Patent Application No. 2020235037, mailed on May 26, 2022", 3 pages.
"Office Action received for Australian Patent Application No. 2020235790, mailed on Aug. 25, 2022", 4 pages.
"Office Action received for Chinese Patent Application No. 202080035083.1, mailed on Jun. 19, 2023", 8 pages (English Translation Only).
"Office Action received for Russian Patent Application No. 2021126494, mailed on May 24, 2022", 9 pages.
"Office Action received for Russian Patent Application No. 2021126540, mailed on May 20, 2022", 8 pages (Official Copy Only).
"Office Action received for Russian Patent Application No. 2021126648, mailed on May 31, 2022", 9 pages.
"Reasons for Refusal received for Japanese Patent Application No. 2021-554584, mailed on Jan. 17, 2023", 18 pages (9 pages of English Translation and 9 pages of Official Copy).
"Reasons for Refusal received for Japanese Patent Application No. 2023-111257, mailed on Jul. 2, 2024", 7 pages (3 pages of English Translation and 4 pages of Official Copy).
"Reasons for Refusal received for Japanese Patent Application No. 2023-078545, mailed on Aug. 13, 2024", 3 pages. (English Translation only).
"UA Office Action in Ukranian Appln No. 177234A24 dated, Sep. 4, 2024", 8 pages.
Iurzhenko , et al., "Welding of High-Tech Plastics", Sumy University Book, 2016, 320 pages.
Japanese Patent Application No. 2023078545, Notice of Reasons for Rejection, mailed Jan. 21, 2025, 6 pages (3 pages translation, 3 pages original).

* cited by examiner

AEROSOL PROVISION DEVICE

PRIORITY CLAIM

The present application is a National Phase entry of PCT Application No. PCT/EP2020/056246, filed Mar. 9, 2020, which claims priority from U.S. Provisional Application No. 62/816,319, filed Mar. 11, 2019, each of which is hereby fully incorporated herein by reference.

TECHNICAL FIELD

The present invention relates to an aerosol provision device, and a magnetic shield member for an aerosol provision device.

BACKGROUND

Smoking articles such as cigarettes, cigars and the like burn tobacco during use to create tobacco smoke. Attempts have been made to provide alternatives to these articles that burn tobacco by creating products that release compounds without burning. Examples of such products are heating devices which release compounds by heating, but not burning, the material. The material may be for example tobacco or other non-tobacco products, which may or may not contain nicotine.

SUMMARY

According to a first aspect of the present disclosure, there is provided an aerosol provision device. The device includes a receptacle configured to receive aerosol generating material, wherein the aerosol generating material is heatable by a susceptor; an inductor coil extending around the receptacle, wherein the inductor coil is configured to generate a varying magnetic field for heating the susceptor; and a magnetic shield member extending at least partially around the inductor coil.

According to a second aspect of the present disclosure, there is provided a magnetic shield member for an aerosol provision device. The magnetic shield member is formed from a sheet and comprises: a magnetic shielding layer; an adhesive layer applied to a first side of the magnetic shielding layer; a laminate layer applied to a second side of the magnetic shielding layer; a first notch formed on the sheet, the first notch being configured to receive a section of wire forming a first inductor coil of the aerosol provision device; and a second notch formed on the sheet, the second notch being configured to receive a section of wire forming a second inductor coil of the aerosol provision device.

According to a third aspect of the present disclosure there is provided an aerosol provision device. The device includes a susceptor arranged to heat aerosol generating material; an inductor coil extending around the susceptor, wherein the inductor coil is configured to generate a varying magnetic field for heating the susceptor; and an outer cover forming at least a portion of an outer surface of the aerosol provision device, wherein an outer surface of the outer cover is positioned away from an outer surface of the susceptor; wherein, in use, a temperature of the outer surface remains below about 48° C.

Further features and advantages of the invention will become apparent from the following description of preferred embodiments of the invention, given by way of example only, which is made with reference to the accompanying drawings.

DETAILED DESCRIPTION OF THE DRAWINGS

Figure 1:
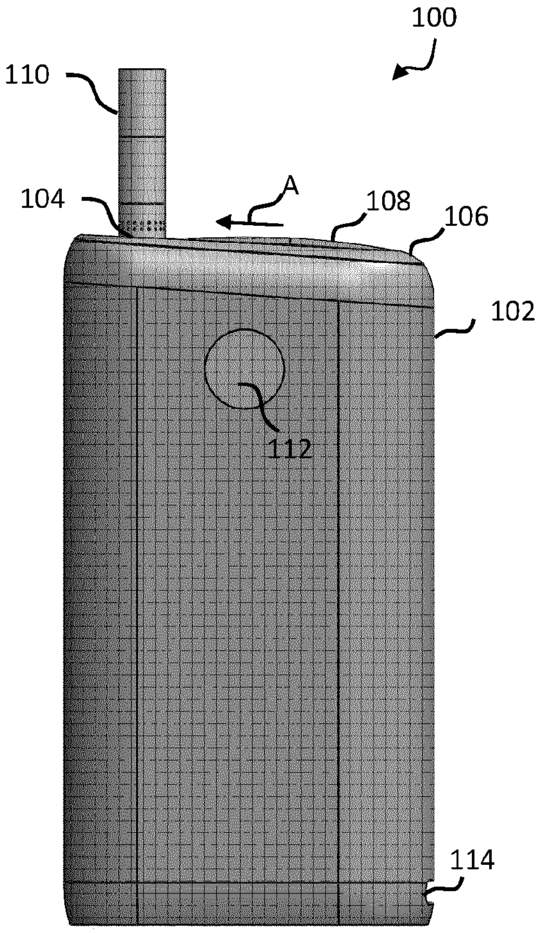
FIG. 1 shows a front view of an example of an aerosol provision device.

As used herein, the term "aerosol generating material" includes materials that provide volatilized components upon heating, typically in the form of an aerosol. Aerosol generating material includes any tobacco-containing material and may, for example, include one or more of tobacco, tobacco derivatives, expanded tobacco, reconstituted tobacco or tobacco substitutes. Aerosol generating material also may include other, non-tobacco, products, which, depending on the product, may or may not contain nicotine. Aerosol generating material may for example be in the form of a solid, a liquid, a gel, a wax or the like. Aerosol generating material may for example also be a combination or a blend of materials. Aerosol generating material may also be known as "smokable material".

Apparatus is known that heats aerosol generating material to volatilize at least one component of the aerosol generating material, typically to form an aerosol which can be inhaled, without burning or combusting the aerosol generating material. Such an apparatus is sometimes described as an "aerosol generating device," an "aerosol provision device," a "heat-not-burn device," a "tobacco heating product device," or a "tobacco heating device" or similar. Similarly, there are also so-called e-cigarette devices, which typically vaporize an aerosol generating material in the form of a liquid, which may or may not contain nicotine. The aerosol generating material may be in the form of or be provided as part of a rod, cartridge or cassette or the like which can be inserted into the apparatus. A heater for heating and volatilizing the aerosol generating material may be provided as a "permanent" part of the apparatus.

An aerosol provision device can receive an article comprising aerosol generating material for heating. An "article" in this context is a component that includes or contains in use the aerosol generating material, which is heated to volatilize the aerosol generating material, and optionally other components in use. A user may insert the article into the aerosol provision device before it is heated to produce an aerosol, which the user subsequently inhales. The article may be, for example, of a predetermined or specific size that is configured to be placed within a heating chamber of the device which is sized to receive the article.

A first aspect of the present disclosure defines an aerosol provision device with a receptacle configured to receive aerosol generating material, which is heatable by a susceptor. The receptacle may be, for example, defined by the susceptor such that the susceptor receives the aerosol generating material. For example, the susceptor may be substantially tubular (i.e., hollow) and can receive the aerosol generating material therein. In one example, the aerosol generating material is tubular or cylindrical in nature, and may be known as a "tobacco stick," for example, the aerosolizable material may comprise tobacco formed in a specific shape which is then coated, or wrapped in one or more other materials, such as paper or foil. Alternatively, the susceptor may not be a component of the device, but is attached to, or contained within the article introduced into the device.

The susceptor can be heated by penetrating the susceptor with a varying magnetic field, produced by at least one inductor coil. The heated susceptor in turn heats the aerosol generating material located within the susceptor. The device therefore further comprises an inductor coil which extends around the receptacle/susceptor.

To shield electrical components of the device (and other nearby electrical devices) from the electromagnetic radiation generated by the inductor coil(s), the device may comprise a magnetic shield member to block/absorb the electromagnetic radiation. The magnetic shield member may comprise one or more layers/sheets of ferrite material to mitigate the effects of the electromagnetic radiation.

In the first aspect, the magnetic shield member extends at least partially around the inductor coil. The magnetic shield member comprises material, such as ferrite material, which absorbs/blocks electromagnetic radiation.

Preferably, the magnetic shield member is in contact with the inductor coil. Often ferrite material is adhered to an inner surface of a device's housing/cover, however this requires a large quantity of ferrite material to adequately contain the electromagnetic radiation. This material can be relatively heavy, bulky and expensive, so it is desirable to reduce the amount used. By being arranged closer to the inductor coil, a reduced quantity of ferrite material is needed. It has been found that in some circumstances, the amount of material used can be reduced by up to 30%.

In addition to this benefit, it has surprisingly been found that by being in contact with the inductor coil creates an effective thermal barrier between the hot susceptor and the outer casing/housing of the device. For example, an insulating air gap is provided between the magnetic shield member and the outer cover/housing of the device. The magnetic shield member can also act as an insulator, trapping heat in the vicinity of the susceptor and inductor coil(s). These effects can reduce the surface temperature of the device, thereby making the device more comfortable and safe to use.

In some examples, the device further comprises a temperature sensor in contact with the inductor coil to measure a temperature of the inductor coil. When the magnetic shield member is in contact with the inductor coil, the temperature sensor may more accurately measure the temperature of the inductor coil.

The inductor coil may extend around the susceptor/receptacle in a helical fashion. The susceptor may define a longitudinal axis, such that the magnetic shield member extends around the longitudinal axis in an azimuthal direction, therefore forming a full or partial tube-like structure.

The magnetic shield member may comprise a magnetic shielding layer, such as a ferrite layer. A ferrite is a ferrimagnetic material, meaning that it can be magnetized and/or attracted to a magnet. In some examples the magnetic shielding layer is magnetized.

The aerosol provision device may comprise two or more inductor coils. For example, a first inductor coil may extend around a first portion the receptacle/susceptor, and a second inductor coil may extend around a second portion of the receptacle/susceptor. The first and second inductor coils may be arranged adjacent to each other in a direction along the longitudinal axis of the receptacle/susceptor. In such a device, the magnetic shield member may be in contact with, and extend at least partially around, the first and second inductor coils.

In some arrangements, the magnetic shield member may be bonded to the inductor coil by an adhesive layer. The adhesive layer holds the magnetic shield member in place, thereby ensuring adequate shielding from the electromagnetic radiation. Adhesive may be applied to the inductor coil, and the magnetic shield member may be brought into contact with the adhesive. Alternatively, the magnetic shield member may comprise the adhesive layer, and therefore be self-adhesive. For example, the magnetic shield member may comprise a magnetic shielding layer and an adhesive layer. The adhesive layer may be formed on an inner surface of the magnetic shield member (i.e., the surface which is arranged closest to the inductor coil). This can make it more efficient and effective to assemble the device. For example, the magnetic shield member can be applied directly to the inductor coil without first applying adhesive on to the inductor coil.

The magnetic shield member may be rolled around the inductor coil and be at least partially bonded to itself. Such an arrangement provides a more protective/enclosed shield from the electromagnetic radiation because the magnetic shield member is partially or fully sealed along its length. For example, a first edge of the magnetic shield member may overlap with a second edge of the magnetic shield member such that the magnetic shield member is bonded/adhered to itself in the overlapping region. Thus, the magnetic shield member may be formed from a sheet which is rolled into a tube. The bonding may be provided by the adhesive layer of the magnetic shield member for example.

The magnetic shield member may comprise at least one magnetic shielding layer and at least one laminate layer. This may be in addition to, or instead of, the adhesive layer. It has been found that the ferrite material (i.e., the magnetic shielding layer) can begin to crumble over time as a result of repeated heating and cooling within the aerosol provision device. The crumbling material can become loose and rattle within the device. The loose material may damage or affect other components of the device. By including a laminate layer (such as a layer of film), the magnetic shielding layer is less likely to crumble and become loose.

The laminate layer may be arranged towards an outer surface of the magnetic shield member. For example, it may be arranged radially outwards from the magnetic shielding layer. In one example, the laminate layer forms the outer surface of the magnetic shield member. However, in other examples there may be another layer which forms the outer surface. Here, the outer surface is the surface furthest away from the inductor coil. The laminate layer may be adhered to the magnetic shielding layer via adhesive, or it may be self-bonded to the magnetic shielding layer.

In one example, the laminate layer comprises a plastics material. The laminate layer may be a plastic film, for example. In a particular example, the plastic is Polyethylene terephthalate (PET).

The magnetic shield member may have a thickness of between about 0.1 mm and about 5 mm. Preferably the thickness is between about 0.5 mm and about 0.8 mm. This range provides a good balance between increasing the air gap size between the outer cover of the device and reducing the mass of the device (by being thinner) and ensuring adequate absorption of the electromagnetic radiation (by being thicker).

The magnetic shield member may be formed from a sheet, and comprise a notch on the sheet, wherein the notch is configured to receive a section of wire forming the inductor coil. The section of wire may include an end of the inductor coil, for example. The inclusion of one or more notches allow the magnetic shield member to better conform to the inductor coil. The notches/cut-outs mean that the sheet can more easily be wrapped around the inductor coils while also ensuring a greater shielding effect. A notch is an indentation made at an edge of the sheet.

The sheet may be a square/rectangular sheet, with one or more notches "cut out." For example, the rectangular sheet may undergo a process of "notching" where material is removed. Alternatively, the sheet may be manufactured with the notches pre-formed.

The aerosol provision device may further comprise a second inductor coil adjacent to the inductor coil, and the sheet may comprise a second notch formed on the sheet. The second notch is configured to receive a section of wire forming the second inductor coil. The inclusion of additional notches allows the magnetic shield member to better conform to the two inductor coils.

In a particular example, the notch is a first notch and may be formed at a first edge of the sheet, and the second notch may be formed at a second edge of the sheet. Having the notches formed on different edges can make it easier to apply the magnetic shield member to the inductor coils. For example, during assembly, the first notch may be aligned with the first inductor coil before being wrapped around the inductor coils where the second notch receives the second inductor coil.

The first notch may be offset from the second notch in a direction along a longitudinal axis defined by the receptacle/susceptor. This can make it easier to assemble the device because of the offset of the notches. For example, the notches ensure that the sheet can only be wrapped around the coil in the correct way.

As mentioned, a notch is an indentation made at an edge of the sheet. These allow the sheet to be wrapped around the inductor coil(s) after they have been assembled and connected to a printed circuit board, for example. In another embodiment, the notches may be replaced by through holes/apertures, and ends of the inductor coils may be received in the apertures. Such an arrangement may provide greater shielding when compared to the notches, but the magnetic shield member would need to be wrapped around the inductor coil(s) before the ends of the inductor coils(s) are connected to a printed circuit board, for example.

In some examples the aerosol provision device comprises the susceptor, and the susceptor defines the receptacle.

According to the second aspect, a magnetic shield member for an aerosol provision device is provided. The magnetic shield member may be formed from a sheet and comprises: a magnetic shielding layer, an adhesive layer applied to a first side of the magnetic shielding layer, and a laminate layer applied to a second side of the magnetic shielding layer. A first notch may be formed on the sheet, where the first notch is configured to receive a section of wire forming a first inductor coil of the aerosol provision device; and a second notch may be formed on the sheet, where the second notch is configured to receive a section of wire forming a second inductor coil of the aerosol provision device.

In some examples a second adhesive layer may be arranged between the laminate layer and shielding layer.

The first notch may be offset from the second notch in a direction along an axis defined by the sheet. The axis defined by the sheet is an axis which is arranged parallel to an axis defined by the receptacle/susceptor when the sheet is arranged within the device.

The first notch may be formed at a first edge of the sheet and the second notch may be formed at a second edge of the sheet. In an alternative example, the notches may be formed along the same edge of the sheet.

In a particular example, the sheet comprises four notches. For example, the sheet may further comprise a third notch is configured to receive a second section of wire forming a first inductor coil of the aerosol provision device, and a fourth notch configured to receive a second section of wire forming the second inductor coil of the aerosol provision device.

In some examples, the magnetic shield member may not be in contact with the inductor coils. Instead, the magnetic shield member may be adhered to the inner surface of the outer cover.

In some examples, the device comprises two or more inductor coils arranged along the length of the susceptor and between each adjacent inductor coil the device comprises a radially extending wall, such as a washer.

In some examples, the radially extending wall can extend at least partially around the susceptor to separate each inductor coil. It has been found that such radially extending walls act to decouple the induction coils meaning each coil acts independently, or in other words that there are no or lower induced effects in a neighboring non-operated coil. The magnetic flux from each inductor coil can therefore be more localized. In some examples, the walls can help channel/focus energy into the article at location of the wall, which can mean that the total number of coils can be reduced. The radially extending walls can act as a collar around the susceptor. The radially extending wall may be coaxial with the susceptor. Radially extending may mean that the wall extends in a direction parallel to a radius of the tubular susceptor.

In some examples, the wall is attached to (i.e., in contact with) the susceptor. For example, it may extend from the susceptor to the inductor coils. In other examples, the wall is not attached to the susceptor. For example, it may extend from the outer surface of the insulating member. In one example, the walls and susceptor are made from the same material. In a particular example, the walls comprise ferrite.

Accordingly, in one example, there is provided an aerosol provision device, comprising a susceptor, a first inductor coil extending around a first region of the susceptor and a second inductor coil extending around a second region of the susceptor, wherein the device further comprises a radially extending magnetic shield member arranged between the first inductor coil and the second inductor coil. The magnetic shield member and device may comprise any of the features described above and herein.

As mentioned above, the magnetic shield member arrangement creates a thermal barrier between the hot susceptor and the outer casing/housing of the device. Preferably an outer cover of the device is maintained below 48° C. Still more preferably, the outer cover of the device is maintained below 45° C. or below 43° C. during use. In some examples, the outer cover of the device is maintained below 43° C. for at least 3 or 4 back to back heating sessions. A session includes heating the article for a period of between about 3 minutes to about 4 minutes until the aerosol generating material is spent. It has been found that the use of a magnetic shield member on the inductor coils reduces the surface temperature of the outer cover by up to 3° C. Additional, or alternative insulation features, such as the use of an air gap between the susceptor and insulating member can also maintain the temperature of the outer cover below about 48° C.

Accordingly, in another aspect, an aerosol provision device comprises an inductor coil and a susceptor configured to heat aerosol generating material, wherein the inductor coil is arranged to heat the susceptor. The device comprises an outer cover forming at least a portion of an outer surface of the aerosol provision device, wherein an outer surface of the outer cover is positioned away from an outer surface of the susceptor. In use, a temperature of the outer surface remains below about 48° C.

Accordingly, the device remains below about 48° C. for at least one heating session.

Preferably, in use, the temperature of the outer surface remains below about 43° C.

Preferably, in use, the temperature of the outer surface remains below about 43° C. for a period of at least three heating sessions, wherein a heating session lasts for at least 180 seconds. Accordingly, in use, the temperature of the outer surface remains below about 43° C. for a period of at least 540 seconds. A heating session means that the susceptor is being continuously heated during this time. In some examples, the average temperature of the susceptor during a heating session is between about 240° C. and about 300° C. Preferably the heating sessions are performed back-to-back (i.e., begin within less than about 30 seconds, or less than about 20 seconds, or less than about 10 seconds of each other).

More preferably, in use, the temperature of the outer surface remains below about 43° C. for a period of at least four heating sessions.

In some examples, a heating session lasts for at least 210 seconds.

The device may further comprise a magnetic shield member in contact with, and extending at least partially around, the coil. The magnetic shield member may comprise any or all of the features described above in relation to the first and second aspects.

The device may further comprise an insulating member extending around the susceptor. The insulating member can help maintain the temperature of the outer surface below about 48° C. In some examples, the insulating member is positioned away from the susceptor to provide an air gap around the susceptor. The air gap provides an additional thermal barrier.

The insulating member may have a thickness of between about 0.25 mm and about 1 mm. The insulating member (and any air gap between the susceptor and insulating member) helps insulate the outer cover from the heated susceptor.

The insulating member may be constructed from any insulating material, such as plastic for example. In a particular example, the insulating member is constructed from polyether ether ketone (PEEK). PEEK has good insulating properties and is well suited for use in an aerosol provision device.

In another example, the insulating member may comprise mica or mica-glass ceramic. These materials have good insulation properties.

The insulating member may have a thermal conductivity of less than about 0.5 W/mK, or less than about 0.4 W/mK. For example, the thermal conductivity may be about 0.3 W/mK. PEEK has a thermal conductivity of about 0.32 W/mK.

The insulating member may have a melting point of greater than about 320° C., such as greater than about 300° C., or greater than about 340° C. PEEK has a melting point of 343° C. Insulating members with such melting points ensure that the insulating member remains rigid/solid when the susceptor is heated.

The inner surface of the outer cover may be positioned away from the outer surface of the insulating member by a distance of between about 2 mm and about 3 mm. It has been found that a separation distance of this size provides enough insulation to ensure that the outer cover does not get too hot. Air may be located between the outer surface of the insulating member and the outer cover.

More particularly, the inner surface of the outer cover may be positioned away from the outer surface of the insulating member by a distance of between about 2 mm and about 2.5 mm, such as about 2.3 mm. Such dimensions provide a good balance between providing insulation while reducing the dimensions of the device.

An inner surface of the outer cover may be positioned away from an outer surface of the susceptor by a distance of between about 4 mm and about 6 mm. This distance is the distance between the outer surface of the susceptor and the inner surface of the outer cover at its closest point. The distance may therefore be the minimum distance between the outer surface of the susceptor and the inner surface of the outer cover. In one example, the distance may be measured between the susceptor and a side surface of the device. It has been found that when the outer is cover is positioned away from the susceptor by this distance, the outer cover is insulated enough from the heated susceptor to keep the surface temperature below 48° C., while reducing the size and weight of the device. Thus, distances within this range represents a good balance between insulation properties and device dimensions.

In one example, the inner surface of the outer cover is positioned away from the outer surface of the susceptor by a distance of between about 5 mm and about 6 mm. Preferably, the inner surface of the outer cover is positioned away from the outer surface of the susceptor by a distance of between about 5 mm and about 5.5 mm, such as between about 5.3 mm and about 5.4 mm. A spacing within this range of distances provides better insulation while also ensuring that the device remains small and lightweight. In a particular example, the spacing is 5.3 mm.

The device may further comprise at least one insulation layer positioned between the outer cover and the susceptor. The insulation layer insulates the outer cover from the susceptor.

An insulation layer may be located in any or all of the following locations: (i) between the susceptor and insulating member, (ii) between the insulating member and the coil, (iii) between the coil and outer cover. In (ii), the insulating member may have a smaller outer diameter to accommodate the insulation layer. Additionally, or alternatively, the coil may have a larger inner diameter to accommodate the insulation layer. The insulation layer may comprise multiple layers of materials.

The insulation layer may be provided by any of the following materials (i) air (which has a thermal conductivity of about 0.02 W/mK), (ii) AeroZero® (which has a thermal conductivity of between about 0.03 W/mK and about 0.04 W/mK), (iii) polyether ether ketone (PEEK) (which may have a thermal conductivity of about 0.25 W/mK in some examples), (iv) ceramic cloth (which has a specific heat of about 1.13 kJ/kgK), (v) thermal putty.

In some examples, the outer surface of the outer cover comprises a coating. The coating and/or outer cover may have a high thermal conductivity. For example, the conductivity may be greater than about 200 W/mK. A relatively high thermal conductivity ensures that heat disperses throughout the outer cover, which in turn is lost to the atmosphere, thereby cooling the device. In a particular example, the coating is soft touch paint.

In some examples, the device comprises a temperature sensor arranged to measure a temperature of the battery. The device may comprise a controller that is configured to cause the device to stop heating when the temperature of the battery is equal to or greater than a threshold temperature. The threshold temperature may be about 45° C. or 50° C., for example.

An inner surface of the outer cover may be positioned away from an outer surface of the susceptor by a distance of between about 4 mm and about 6 mm. This distance is the distance between the outer surface of the susceptor and the inner surface of the outer cover at its closest point. The distance may therefore be the minimum distance between the outer surface of the susceptor and the inner surface of the outer cover. In one example, the distance may be measured between the susceptor and a side surface of the device. It has been found that when the outer is cover is positioned away from the susceptor by this distance, the outer cover is insulated enough from the heated susceptor to avoid discomfort or injury to a user, while reducing the size and weight of the device. Thus, distances within this range represents a good balance between insulation properties and device dimensions.

The outer cover may also be known as an outer casing. The outer casing may fully surround the device, or may extend partially around the device.

In one example, the inner surface of the outer cover is positioned away from the outer surface of the susceptor by a distance of between about 5 mm and about 6 mm. Preferably, the inner surface of the outer cover is positioned away from the outer surface of the susceptor by a distance of between about 5 mm and about 5.5 mm, such as between about 5.3 mm and about 5.4 mm. A spacing within this range of distances provides better insulation while also ensuring that the device remains small and lightweight. In a particular example, the spacing is 5.3 mm.

In some examples, in use, the coil is configured to heat the susceptor to a temperature of between about 240° C. and about 300° C., such as between about 250° C. and about 280° C. When the outer cover is spaced apart from the susceptor by at least this distance, the temperature of the outer cover remains at a safe level, such as less than about 48° C., or less than about 43° C.

In some examples, an air gap is formed between the coil and the outer cover. The air gap provides insulation.

The inner surface of the outer cover may be positioned away from an outer surface of the coil by a distance of between about 0.2 mm and about 1 mm. In some examples the coil itself may heat up as it is used to induce a magnetic field, for example from resistive heating due to the current passing through it to induce the magnetic field. Providing a spacing between the coil and outer cover ensures that the heated coil is insulated from the outer cover. In some examples, ferrite shielding is located between the inner surface of the outer cover and the coil. The ferrite shielding additionally helps insulate the inner surface of the outer cover. It has been found that when the ferrite shielding is in contact with, and at least partially surrounds the one or more coils, the surface temperature of the outer cover can be reduced by about 3° C.

In one example, the coil comprises litz wire, and the litz wire has a circular shaped cross section. In such an example, the inner surface of the outer cover is positioned away from the outer surface of the coil by a distance of between about 0.2 mm and about 0.5 mm, or between about 0.2 mm and about 0.3 mm such as about 0.25 mm.

In one example, the coil comprises litz wire, and the litz wire has a rectangular shaped cross section. In such an example, the inner surface of the outer cover is positioned away from an outer surface of the coil by a distance of between about 0.5 mm and about 1 mm, or between about 0.8 mm and about 1 mm, such as about 0.9 mm. A litz wire with a circular cross section can be arranged closer to the outer cover than a litz wire with a rectangular cross section because the circular cross section wire has a smaller surface area exposed towards the outer cover.

The inner surface of the coil may be positioned away from the outer surface of the susceptor by a distance of between about 3 mm and about 4 mm.

The outer cover may comprise aluminum. Aluminum has good heat dissipation properties. The outer cover may have a thermal conductivity of between about 200 W/mK and about 220 W/mK. For example, aluminum has a thermal conductivity of around 209 W/mK. Thus, the outer cover may have a relatively high thermal conductivity to ensure that it heat disperses throughout the outer cover, which in turn is lost to the atmosphere, thereby cooling the device.

The outer cover may have a thickness of between about 0.75 mm and about 2 mm. The outer cover can therefore also act as an insulating barrier. These thicknesses provide a good balance between providing good insulation and reducing the size and weight of the device. Preferably the outer cover has a thickness of between about 0.75 mm and about 1.25 mm, such as about 1 mm.

FIG. 1 shows an example of an aerosol provision device 100 for generating aerosol from an aerosol generating medium/material. In broad outline, the device 100 may be used to heat a replaceable article 110 comprising the aerosol generating medium, to generate an aerosol or other inhalable medium which is inhaled by a user of the device 100.

The device 100 comprises a housing 102 (in the form of an outer cover) which surrounds and houses various components of the device 100. The device 100 has an opening 104 in one end, through which the article 110 may be inserted for heating by a heating assembly. In use, the article 110 may be fully or partially inserted into the heating assembly where it may be heated by one or more components of the heater assembly.

The device 100 of this example comprises a first end member 106 which comprises a lid 108 which is moveable relative to the first end member 106 to close the opening 104 when no article 110 is in place. In FIG. 1, the lid 108 is shown in an open configuration, however the lid 108 may move into a closed configuration. For example, a user may cause the lid 108 to slide in the direction of arrow "A".

The device 100 may also include a user-operable control element 112, such as a button or switch, which operates the device 100 when pressed. For example, a user may turn on the device 100 by operating the switch 112.

The device 100 may also comprise an electrical component, such as a socket/port 114, which can receive a cable to charge a battery of the device 100. For example, the socket 114 may be a charging port, such as a USB charging port.

Figure 2:
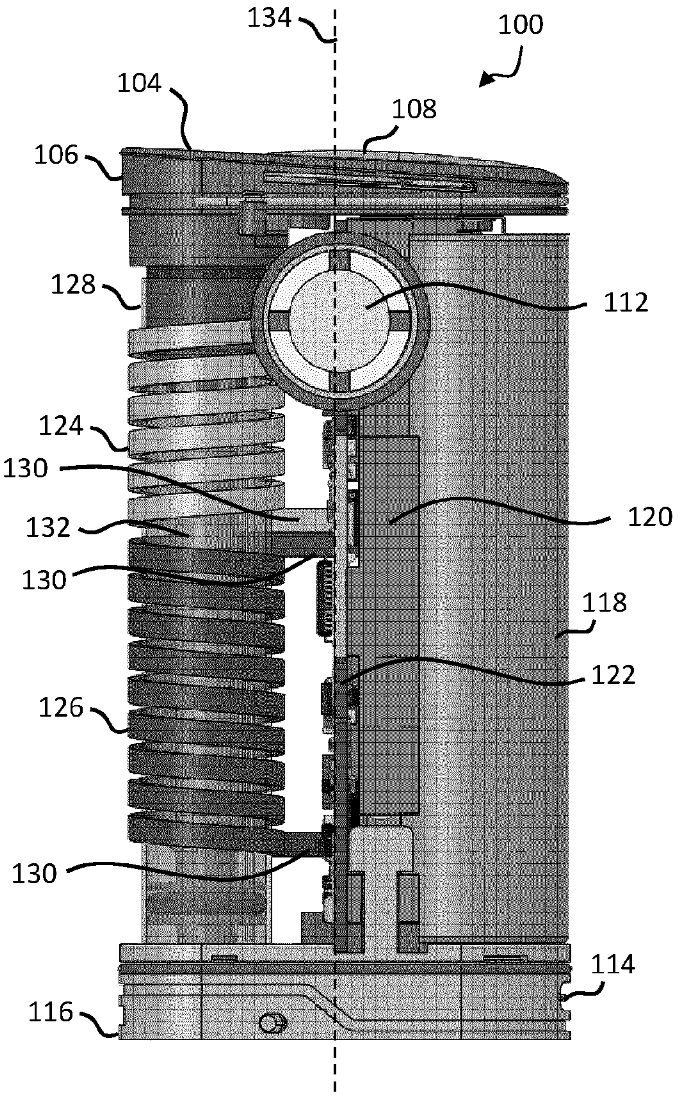
FIG. 2 shows a front view of the aerosol provision device of FIG. 1 with an outer cover removed.

FIG. 2 depicts the device 100 of FIG. 1 with the outer cover 102 removed and without an article 110 present. The device 100 defines a longitudinal axis 134.

As shown in FIG. 2, the first end member 106 is arranged at one end of the device 100 and a second end member 116 is arranged at an opposite end of the device 100. The first and second end members 106, 116 together at least partially define end surfaces of the device 100. For example, the bottom surface of the second end member 116 at least partially defines a bottom surface of the device 100. Edges of the outer cover 102 may also define a portion of the end surfaces. In this example, the lid 108 also defines a portion of a top surface of the device 100.

The end of the device closest to the opening 104 may be known as the proximal end (or mouth end) of the device 100 because, in use, it is closest to the mouth of the user. In use, a user inserts an article 110 into the opening 104, operates the user control 112 to begin heating the aerosol generating material and draws on the aerosol generated in the device. This causes the aerosol to flow through the device 100 along a flow path towards the proximal end of the device 100.

The other end of the device furthest away from the opening 104 may be known as the distal end of the device 100 because, in use, it is the end furthest away from the mouth of the user. As a user draws on the aerosol generated in the device, the aerosol flows away from the distal end of the device 100.

The device 100 further comprises a power source 118. The power source 118 may be, for example, a battery, such as a rechargeable battery or a non-rechargeable battery. Examples of suitable batteries include, for example, a lithium battery, (such as a lithium-ion battery), a nickel battery (such as a nickel-cadmium battery), and an alkaline battery. The battery is electrically coupled to the heating assembly to supply electrical power when required and under control of a controller (not shown) to heat the aerosol generating material. In this example, the battery is connected to a central support 120 which holds the battery 118 in place.

The device further comprises at least one electronics module 122. The electronics module 122 may comprise, for example, a printed circuit board (PCB). The PCB 122 may support at least one controller, such as a processor, and memory. The PCB 122 may also comprise one or more electrical tracks to electrically connect together various electronic components of the device 100. For example, the battery terminals may be electrically connected to the PCB 122 so that power can be distributed throughout the device 100. The socket 114 may also be electrically coupled to the battery via the electrical tracks.

In the example device 100, the heating assembly is an inductive heating assembly and comprises various components to heat the aerosol generating material of the article 110 via an inductive heating process. Induction heating is a process of heating an electrically conducting object (such as a susceptor) by electromagnetic induction. An induction heating assembly may comprise an inductive element, for example, one or more inductor coils, and a device for passing a varying electric current, such as an alternating electric current, through the inductive element. The varying electric current in the inductive element produces a varying magnetic field. The varying magnetic field penetrates a susceptor suitably positioned with respect to the inductive element, and generates eddy currents inside the susceptor. The susceptor has electrical resistance to the eddy currents, and hence the flow of the eddy currents against this resistance causes the susceptor to be heated by Joule heating. In cases where the susceptor comprises ferromagnetic material such as iron, nickel or cobalt, heat may also be generated by magnetic hysteresis losses in the susceptor, i.e. by the varying orientation of magnetic dipoles in the magnetic material as a result of their alignment with the varying magnetic field. In inductive heating, as compared to heating by conduction for example, heat is generated inside the susceptor, allowing for rapid heating. Further, there need not be any physical contact between the inductive heater and the susceptor, allowing for enhanced freedom in construction and application.

The induction heating assembly of the example device 100 comprises a susceptor arrangement 132 (herein referred to as "a susceptor"), a first inductor coil 124 and a second inductor coil 126. The first and second inductor coils 124, 126 are made from an electrically conducting material. In this example, the first and second inductor coils 124, 126 are made from Litz wire/cable which is wound in a helical fashion to provide helical inductor coils 124, 126. Litz wire comprises a plurality of individual wires which are individually insulated and are twisted together to form a single wire. Litz wires are designed to reduce the skin effect losses in a conductor. In the example device 100, the first and second inductor coils 124, 126 are made from copper Litz wire which has a rectangular cross section. In other examples the Litz wire can have other shape cross sections, such as circular.

The first inductor coil 124 is configured to generate a first varying magnetic field for heating a first section of the susceptor 132 and the second inductor coil 126 is configured to generate a second varying magnetic field for heating a second section of the susceptor 132. In this example, the first inductor coil 124 is adjacent to the second inductor coil 126 in a direction along the longitudinal axis 134 of the device 100 (that is, the first and second inductor coils 124, 126 to not overlap). The susceptor arrangement 132 may comprise a single susceptor, or two or more separate susceptors. Ends 130 of the first and second inductor coils 124, 126 can be connected to the PCB 122.

It will be appreciated that the first and second inductor coils 124, 126, in some examples, may have at least one characteristic different from each other. For example, the first inductor coil 124 may have at least one characteristic different from the second inductor coil 126. More specifically, in one example, the first inductor coil 124 may have a different value of inductance than the second inductor coil 126. In FIG. 2, the first and second inductor coils 124, 126 are of different lengths such that the first inductor coil 124 is wound over a smaller section of the susceptor 132 than the second inductor coil 126. Thus, the first inductor coil 124 may comprise a different number of turns than the second inductor coil 126 (assuming that the spacing between individual turns is substantially the same). In yet another example, the first inductor coil 124 may be made from a different material to the second inductor coil 126. In some examples, the first and second inductor coils 124, 126 may be substantially identical.

In this example, the first inductor coil 124 and the second inductor coil 126 are wound in opposite directions. This is can be useful when the inductor coils are active at different times. For example, initially, the first inductor coil 124 may be operating to heat a first section of the article 110, and at a later time, the second inductor coil 126 may be operating to heat a second section of the article 110. Winding the coils in opposite directions helps reduce the current induced in the inactive coil when used in conjunction with a particular type of control circuit. In FIG. 2, the first inductor coil 124 is a right-hand helix and the second inductor coil 126 is a left-hand helix. However, in another embodiment, the inductor coils 124, 126 may be wound in the same direction, or the first inductor coil 124 may be a left-hand helix and the second inductor coil 126 may be a right-hand helix.

The susceptor 132 of this example is hollow and therefore defines a receptacle within which aerosol generating material is received. For example, the article 110 can be inserted into the susceptor 132. In this example the susceptor 120 is tubular, with a circular cross section.

The device 100 of FIG. 2 further comprises an insulating member 128 which may be generally tubular and at least partially surround the susceptor 132. The insulating member 128 may be constructed from any insulating material, such as plastic for example. In this particular example, the insulating member is constructed from polyether ether ketone (PEEK). The insulating member 128 may help insulate the various components of the device 100 from the heat generated in the susceptor 132.

The insulating member 128 can also fully or partially support the first and second inductor coils 124, 126. For example, as shown in FIG. 2, the first and second inductor coils 124, 126 are positioned around the insulating member 128 and are in contact with a radially outward surface of the insulating member 128. In some examples the insulating member 128 does not abut the first and second inductor coils 124, 126. For example, a small gap may be present between the outer surface of the insulating member 128 and the inner surface of the first and second inductor coils 124, 126.

In a specific example, the susceptor 132, the insulating member 128, and the first and second inductor coils 124, 126 are coaxial around a central longitudinal axis of the susceptor 132.

Figure 3:
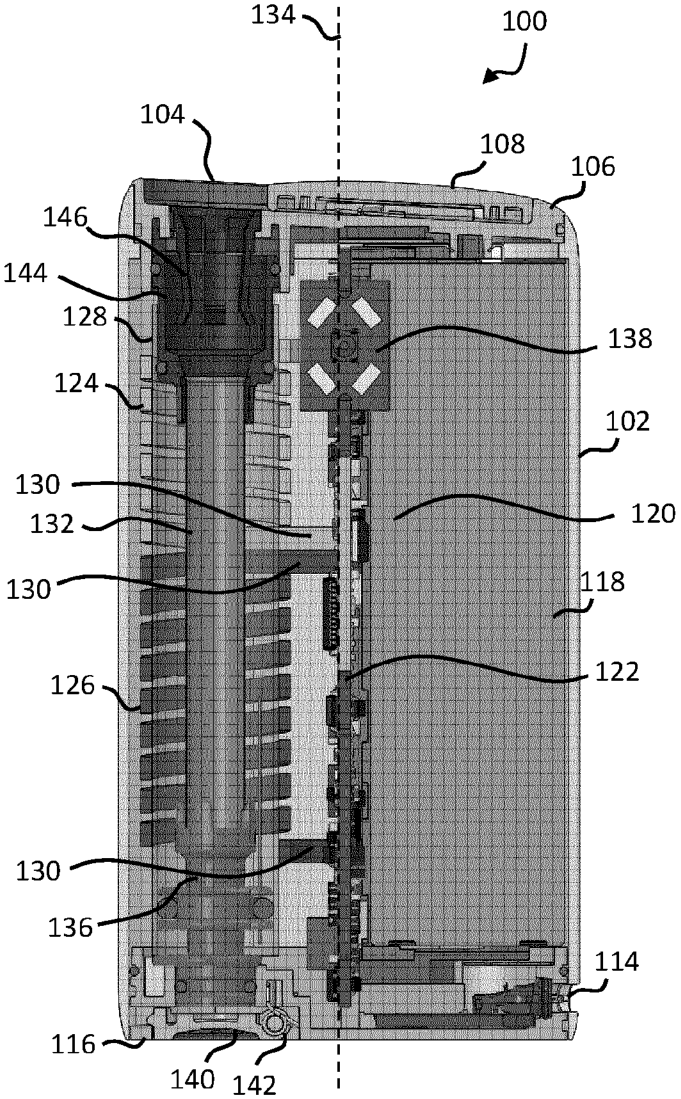
FIG. 3 shows a cross-sectional view of the aerosol provision device of FIG. 1.

FIG. 3 shows a side view of device 100 in partial cross-section. The outer cover 102 is present in this example. The rectangular cross-sectional shape of the first and second inductor coils 124, 126 is more clearly visible.

The device 100 further comprises a support 136 which engages one end of the susceptor 132 to hold the susceptor 132 in place. The support 136 is connected to the second end member 116.

The device may also comprise a second printed circuit board 138 associated within the control element 112.

The device 100 further comprises a second lid/cap 140 and a spring 142, arranged towards the distal end of the device 100. The spring 142 allows the second lid 140 to be opened, to provide access to the susceptor 132. A user may open the second lid 140 to clean the susceptor 132 and/or the support 136.

The device 100 further comprises an expansion chamber 144 which extends away from a proximal end of the susceptor 132 towards the opening 104 of the device. Located at least partially within the expansion chamber 144 is a retention clip 146 to abut and hold the article 110 when received within the device 100. The expansion chamber 144 is connected to the end member 106.

Figure 4:
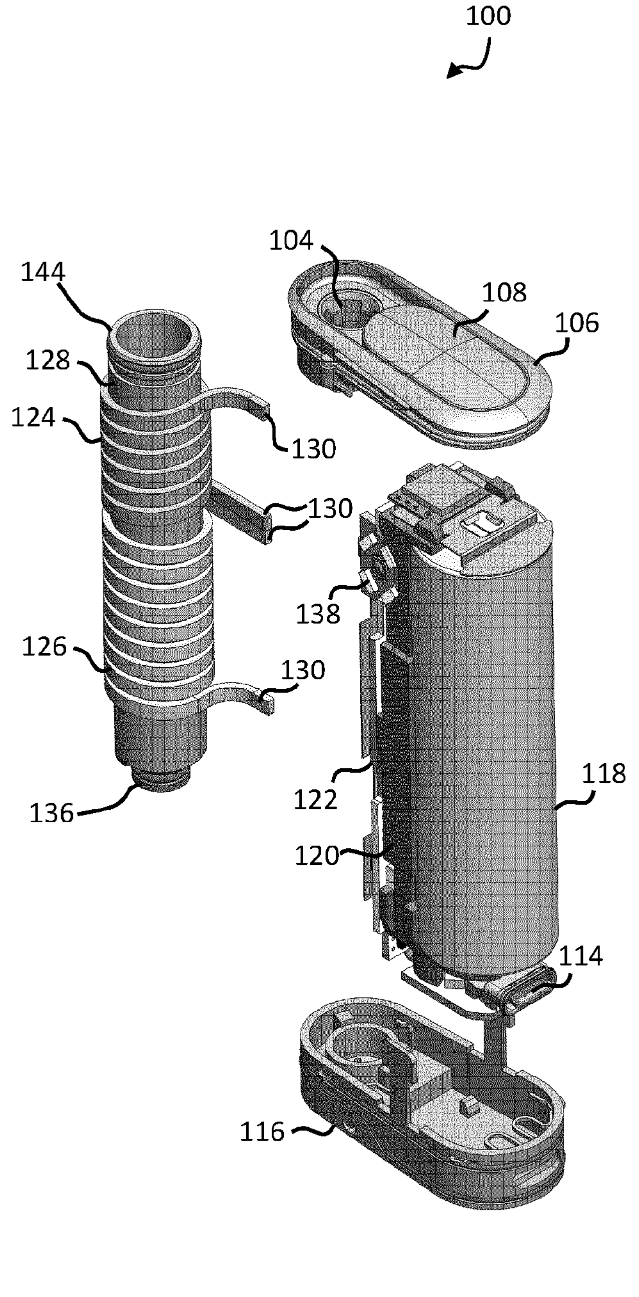
FIG. 4 shows an exploded view of the aerosol provision device of FIG. 2.

FIG. 4 is an exploded view of the device 100 of FIG. 1, with the outer cover 102 omitted.

Figure 5A:
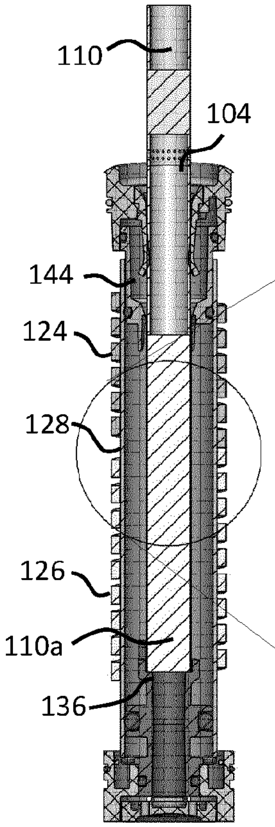
FIG. 5A shows a cross-sectional view of a heating assembly within an aerosol provision device.
Figure 5B:
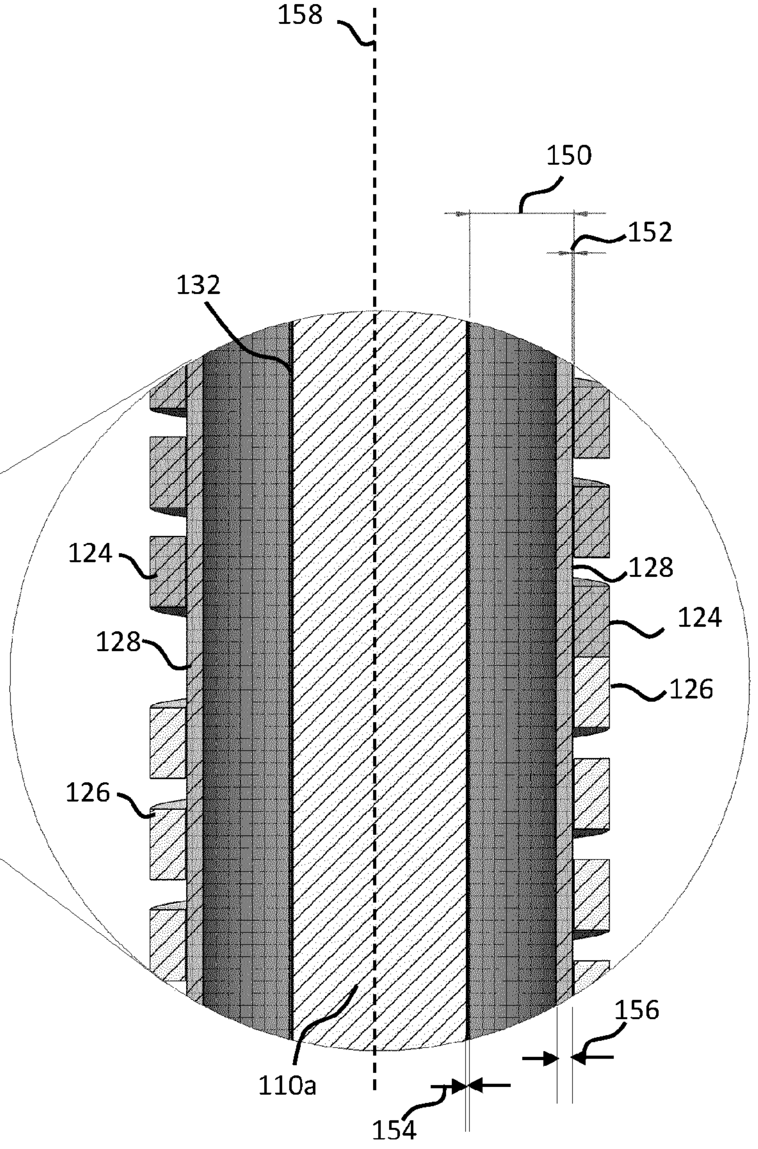
FIG. 5B shows a close-up view of a portion of the heating assembly of FIG. 5A.

FIG. 5A depicts a cross section of a portion of the device 100 of FIG. 1. FIG. 5B depicts a close-up of a region of FIG. 5A. FIGS. 5A and 5B show the article 110 received within the susceptor 132, where the article 110 is dimensioned so that the outer surface of the article 110 abuts the inner surface of the susceptor 132. This ensures that the heating is most efficient. The article 110 of this example comprises aerosol generating material 110*a*. The aerosol generating material 110*a* is positioned within the susceptor 132. The article 110 may also comprise other components such as a filter, wrapping materials and/or a cooling structure.

FIG. 5B shows that the outer surface of the susceptor 132 is spaced apart from the inner surface of the inductor coils 124, 126 by a distance 150, measured in a direction perpendicular to a longitudinal axis 158 of the susceptor 132. In one particular example, the distance 150 is about 3 mm to 4 mm, about 3 mm to 3.5 mm, or about 3.25 mm.

FIG. 5B further shows that the outer surface of the insulating member 128 is spaced apart from the inner surface of the inductor coils 124, 126 by a distance 152, measured in a direction perpendicular to a longitudinal axis 158 of the susceptor 132. In one particular example, the distance 152 is about 0.05 mm. In another example, the distance 152 is substantially 0 mm, such that the inductor coils 124, 126 abut and touch the insulating member 128.

In one example, the susceptor 132 has a wall thickness 154 of about 0.025 mm to 1 mm, or about 0.05 mm.

In one example, the susceptor 132 has a length of about 40 mm to 60 mm, about 40 mm to 45 mm, or about 44.5 mm.

In one example, the insulating member 128 has a wall thickness 156 of about 0.25 mm to 2 mm, 0.25 mm to 1 mm, or about 0.5 mm.

Figure 6:
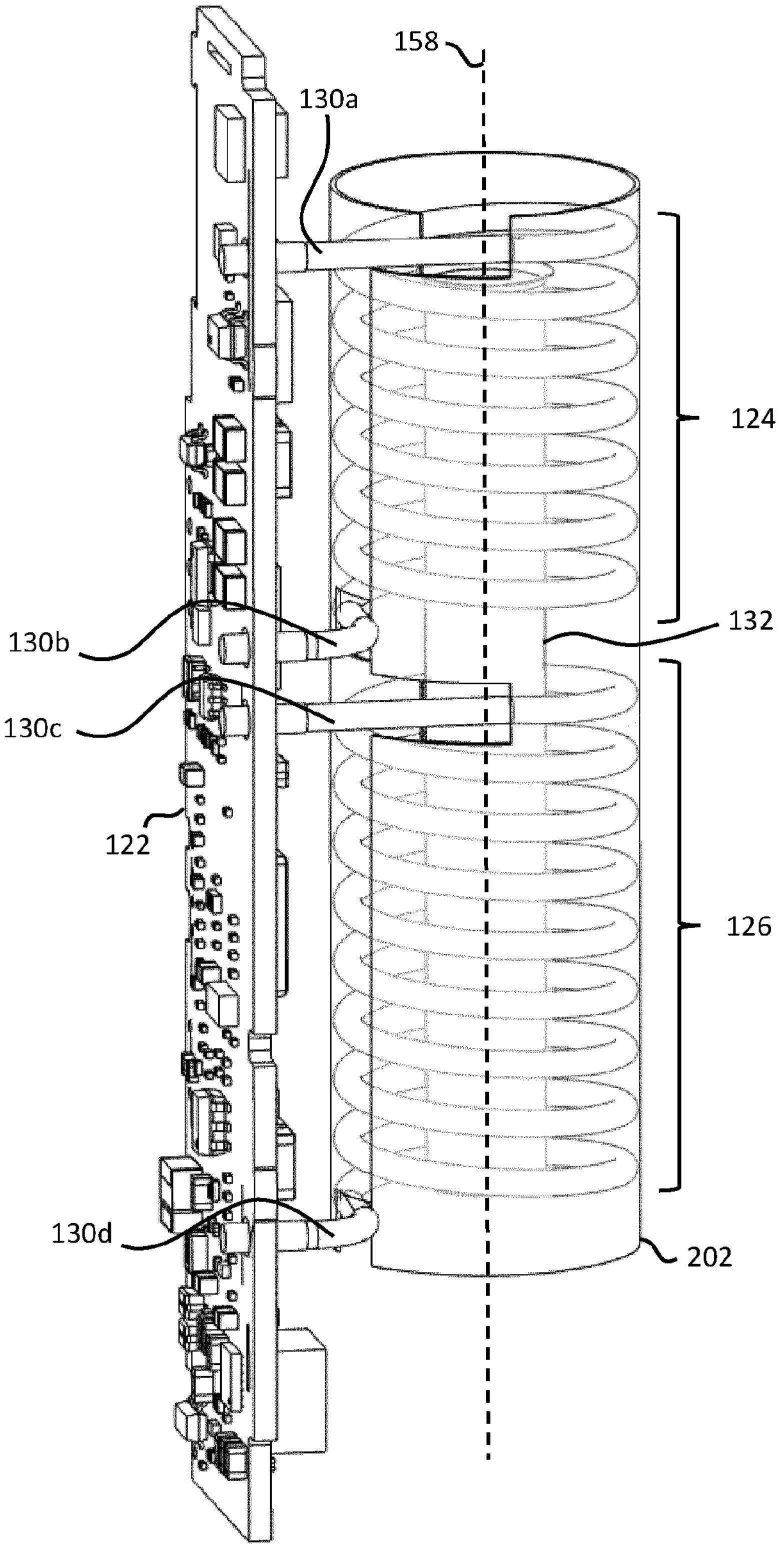
FIG. 6 shows a perspective view of an example magnetic shield member arranged within an aerosol provision device.

FIG. 6 depicts a perspective view of the printed circuit board (PCB) 122, the susceptor 132, the first inductor coil 124 and the second inductor coil 126. In this example the first and second inductor coils 124, 126 are made from wire having a circular cross-section. First and second ends 130*a*, 130*b* of the first inductor coil 124, are connected to the PCB 122. Similarly, first and second ends 130*c*, 130*d* of the second inductor coil 126 are connected to the PCB 122. In some examples, there may only be one inductor coil present.

Extending around the first and second inductor coils 124, 126 is a magnetic shield member 202. This magnetic shield member 202 is in contact with, and surrounds the first and second inductor coils 124, 126 to shield other components of the device 100 and/or other objects from electromagnetic radiation generated within the susceptor and/or first and second inductor coils 124, 126. The magnetic shield member 202 is illustrated as being transparent, to clearly show the inductor coils 124, 126 and the susceptor 132 arranged within the magnetic shield member 202. In this example, the magnetic shield member 202 is held in place via adhesive. In other examples, other features/components of the device 100 and or magnetic shield member 202 may hold the magnetic shield member 202 in place.

The susceptor 132 receives an article 110 and therefore defines a receptacle configured to receive aerosol generating material. In other examples (not shown) the susceptor 132 is part of the article 110, rather than the device 100, and so other components may define the receptacle. The receptacle/susceptor 132 defines an axis 158, such as a longitudinal axis 158, around which the magnetic shield member 202 is wrapped.

The magnetic shield member 202 comprises one or more components which acts as a shield against the electromagnetic radiation. In this example, the magnetic shield member 202 comprises a magnetic shielding layer, such as a ferrite layer, which acts as the shield.

The magnetic shield member 202 may comprise one or more further layers. For example, the magnetic shield member 202 may further comprise an adhesive layer and/or a laminate layer, as described in FIG. 7.

Figure 7:
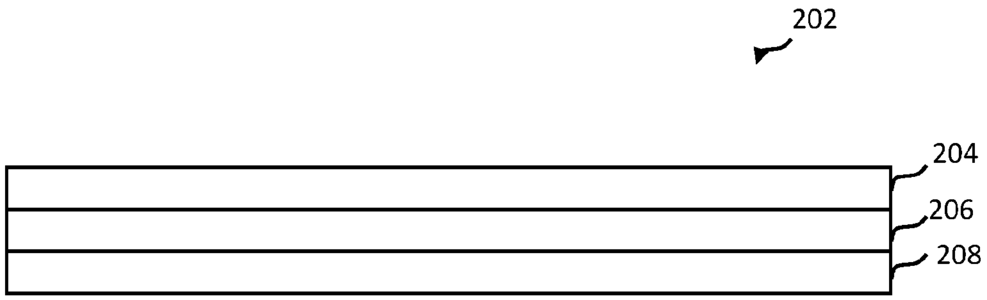
FIG. 7 shows a diagrammatic representation of a cross section of an example magnetic shield member.

FIG. 7 is a diagrammatic representation of a cross-section through an example magnetic shield member 202 before it is wrapped around the first and second inductor coils 123, 126. The magnetic shield member 202 is sheet-like.

In this example, the magnetic shield member 202 comprises at least three layers including a magnetic shielding layer 206, an adhesive layer 204 applied to a first side of the magnetic shielding layer 206, and a laminate layer 208 applied to a second side of the magnetic shielding layer 206.

The adhesive layer 204 is arranged on an inner surface of the magnetic shield member 202 so that the magnetic shield member 202 can be bonded to the first and second inductor coils 124, 126. An additional protective layer (not shown) may cover the adhesive layer 204, which is subsequently removed to expose the adhesive layer 204 before the magnetic shield member 202 is adhered to the first and second inductor coils 124, 126. The inner surface of the magnetic shield member 202 is the surface closest to the first and second inductor coils 124, 126 when the magnetic shield member 202 is in contact with the first and second inductor coils 124, 126. When the magnetic shield member 202 is wrapped around the first and second inductor coils 124, 126 the magnetic shield member may overlap itself in an overlapping region such that part of the adhesive layer 204 is in contact with the laminate layer 208.

The laminate layer 208 is arranged at, or towards an outer surface of the magnetic shield member 202. The outer surface of the magnetic shield member 202 is the surface which is furthest away from the first and second inductor coils 124, 126 when the magnetic shield member 202 is in contact with the first and second inductor coils 124, 126. In some examples, a further layer (not shown) forms the outer surface of the magnetic shield member 202.

As mentioned previously, ferrite material in the magnetic shielding layer 206 can crumble over many heating and cooling cycles. The laminate layer 208 acts to stop the crumbling material in the magnetic shielding layer 206 from coming loose and moving around inside the device 100. The laminate layer 208 may comprise a plastic material, and may be a plastic film, for example. In the present example, the plastic is Polyethylene terephthalate, PET.

In the example of FIG. 7, the laminate layer 208 is directly adjacent to the magnetic shielding layer 208. For example, the laminate layer 208 may be bonded to the magnetic shielding layer 208 via heat sealing. In another example, a second adhesive layer (not shown) may be arranged between the laminate layer 208 and the magnetic shielding layer 206.

Figure 8:
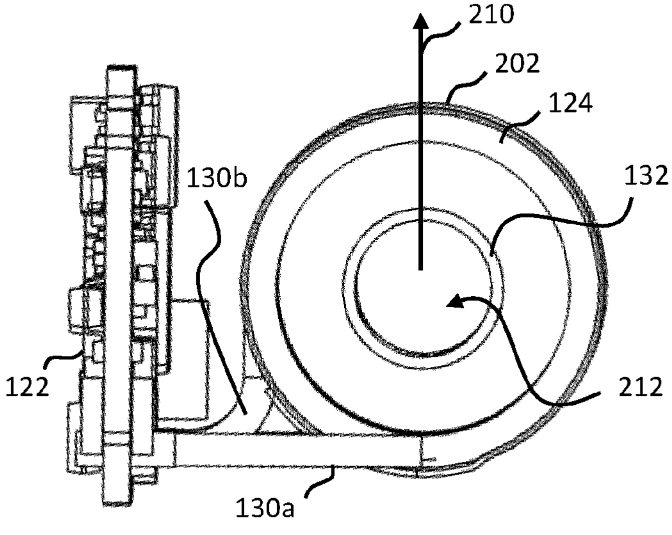
FIG. 8 shows a top-down view of the arrangement shown in FIG. 6.

FIG. 8 depicts a top-down view of the arrangement shown in FIG. 6. The receptacle 212, defined by the susceptor 132, receives the aerosol generating material therein. Arrow 210 indicates a radial direction, which points outwards from the receptacle/susceptor. When the magnetic shield member 202 of FIG. 7 is wrapped around the first and second inductor coils 124, 126, the laminate layer 208 is arranged further away from the first and second inductor coils 124, 126 in the radial direction 210 than the adhesive layer 204.

As shown in FIGS. 6 and 8, the first and second ends 130*a*, 130*b* of the first inductor coil 124 pass through notches/openings/apertures formed in the magnetic shield member 202. These notches allow the magnetic shield member 202 to more closely conform to the first and second inductor coils 124, 126.

Figure 9:
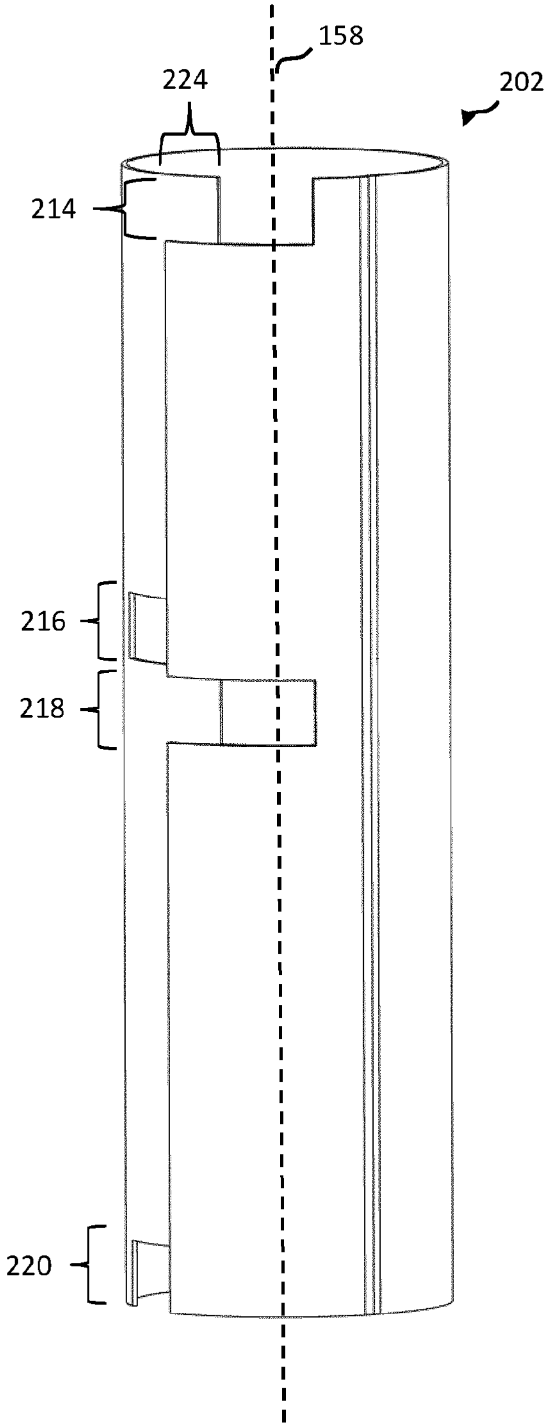
FIG. 9 shows a perspective view of an example magnetic shield member.

FIG. 9 depicts magnetic shield member 202 in isolation of the other components. The sheet-like magnetic shield member 202 is rolled into a cylindrical tube and overlaps in an overlapping region 224. The presence of the adhesive layer 204 means that the magnetic shield member 202 can be bonded to itself in the overlapping region 224 thereby providing an improved shield. In other examples the magnetic shield member 202 does not fully extend around the first and second inductor coils 124, 126.

The magnetic shield member 202 comprises four notches 214, 216, 218, 220. In other examples, there may be one or more notches present. The notches 214, 216, 218, 220 are formed at edges of the magnetic shield member 202 and each receives a section of wire forming the inductor coils 124, 126. The sections of wire include the first and second ends 130*a*, 130*b*, 130*c*, 130*d* of the first and second inductor coils 124, 126 as depicted in FIG. 6.

Figure 10:
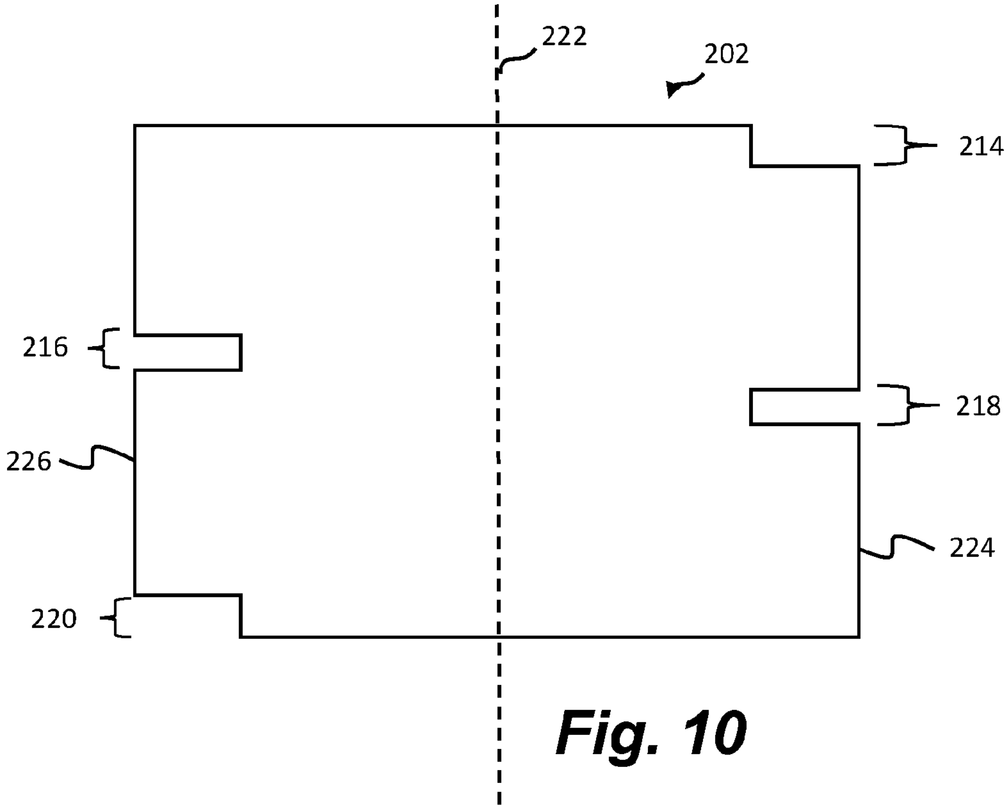
FIG. 10 shows a diagrammatic representation of a first example magnetic shield member comprising notches.

FIG. 10 is a diagrammatic representation of the magnetic shield member 202 of FIG. 9 before it is wrapped around the first and second inductor coils 124, 126. The magnetic shield member 202 is formed from a sheet that is generally rectangular. The sheet defines an axis 222 which is aligned parallel to an axis defined by the receptacle/susceptor 132 and an axis defined by the first and second inductor coils 124, 126 when the magnetic shield member 202 is wrapped around the inductor coils 124, 126.

The sheet comprises a first notch 214 formed at a first edge 224 of the sheet. The first notch 214 receives a section of wire forming the first inductor coil 124, where the section of wire includes the first end 130*a*. The sheet also comprises a second notch 218 formed at the first edge 224 of the sheet. The second notch 218 receives a section of wire forming the second inductor coil 126, where the section of wire includes the first end 130*c*. The sheet further comprises a third notch 216 formed at a second edge 226 of the sheet. The third notch 216 receives a second section of wire forming the first inductor coil 124, where the second section of wire includes the second end 130*b*. The sheet also comprises a fourth notch 220 formed at the second edge 226 of the sheet. The fourth notch 220 receives a second section of wire forming the second inductor coil 126, where the second section of wire includes the second end 130*b*. Thus, for each inductor coil there are two notches formed on opposite edges of the sheet.

The notches 214, 216, 218, 220 are all offset from each other in a direction along the axis 222 defined by the sheet (and are therefore all offset from each other in a direction along the longitudinal axis 158 defined by the susceptor 132 when the magnetic shield member 202 is in place).

Figure 11:
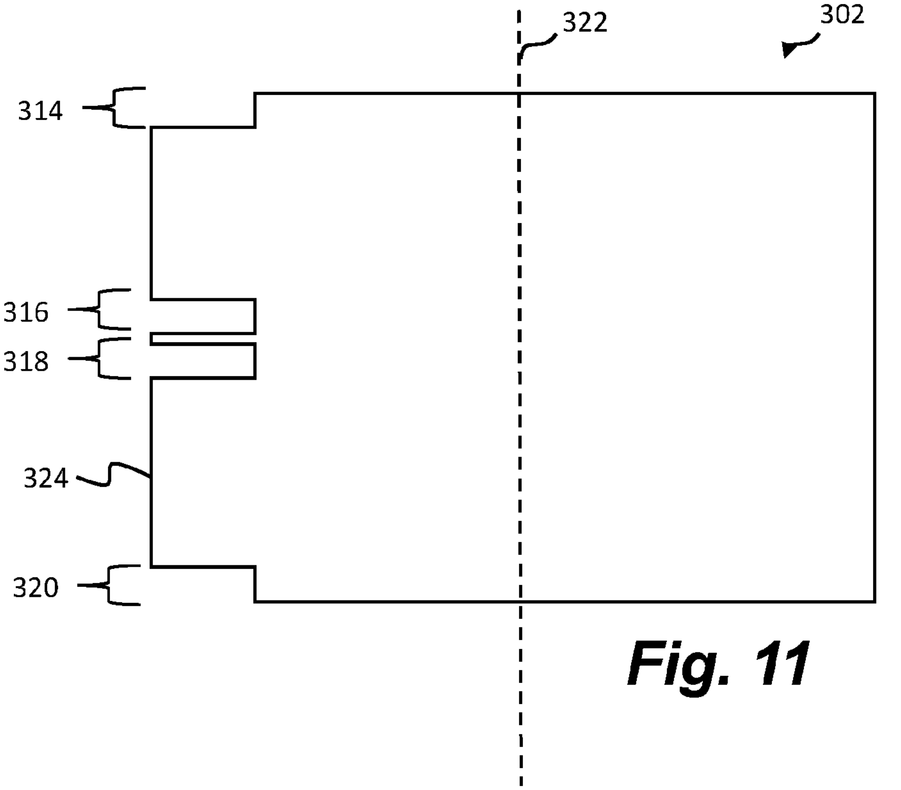
FIG. 11 shows a diagrammatic representation of a second example magnetic shield member comprising notches.

FIG. 11 is a diagrammatic representation of another example magnetic shield member 302 that could be used in the device 100. The magnetic shield member 302 is formed from a sheet that is generally rectangular. The sheet defines an axis 322 which is aligned parallel to an axis defined by the receptacle/susceptor 132 and an axis defined by the first and second inductor coils 124, 126 when the magnetic shield member 202 is wrapped around the inductor coils 124, 126.

Unlike the example of FIG. 10, the magnetic shield member 302 comprises notches formed along one edge of the sheet. For example, the sheet comprises a first notch 314 formed at a first edge 324 of the sheet. The first notch 314 receives a section of wire forming the first inductor coil 124, where the section of wire includes the first end 130*a*. The sheet also comprises a second notch 318 formed at the first edge 324 of the sheet. The second notch 318 receives a section of wire forming the second inductor coil 126, where the section of wire includes the first end 130*c*. The sheet further comprises a third notch 316 formed at the first edge 324 of the sheet. The third notch 316 receives a second section of wire forming the first inductor coil 124, where the second section of wire includes the second end 130*b*. The sheet also comprises a fourth notch 320 formed at the first edge 324 of the sheet. The fourth notch 320 receives a second section of wire forming the second inductor coil 126, where the second section of wire includes the second end 130*b*. Thus, for each inductor coil there are two notches formed at the same edge of the sheet.

The notches 314, 316, 318, 320 are all offset from each other in a direction along the axis 322 defined by the sheet (and are therefore all offset from each other in a direction along the longitudinal axis 158 defined by the susceptor 132 when the magnetic shield member 302 is in place).

Figure 12:
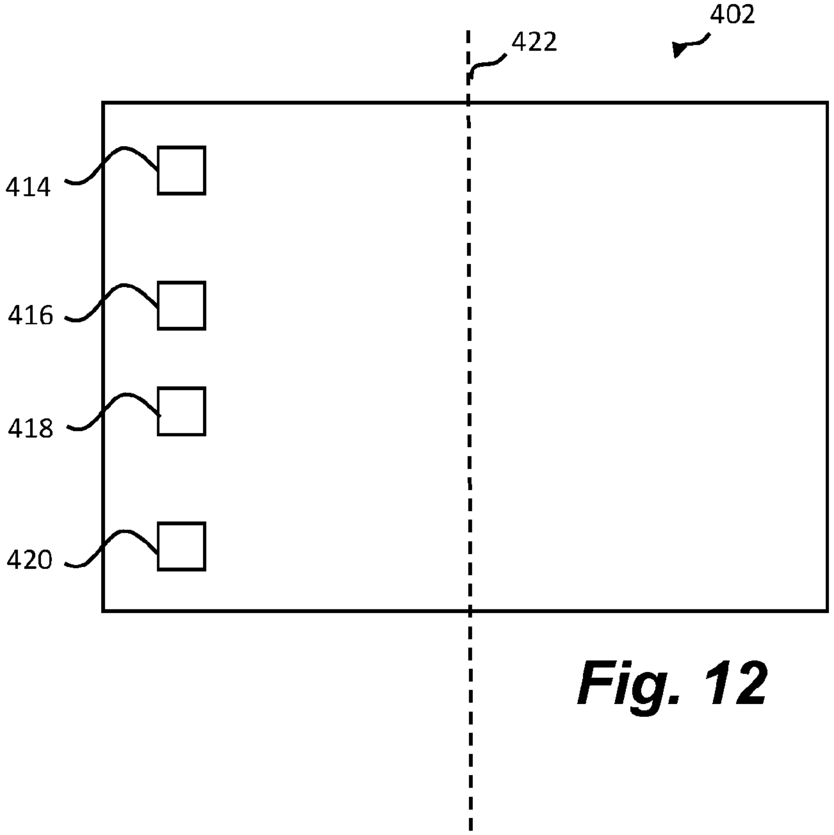
FIG. 12 shows a diagrammatic representation of a third example magnetic shield member comprising apertures.

FIG. 12 is a diagrammatic representation of another example magnetic shield member 402 that could be used in the device 100. The magnetic shield member 402 is formed from a sheet that is generally rectangular. The sheet defines an axis 422 which is aligned parallel to an axis defined by the receptacle/susceptor 132 and an axis defined by the first and second inductor coils 124, 126 when the magnetic shield member 202 is wrapped around the inductor coils 124, 126.

Unlike the example of FIGS. 10 and 11, the magnetic shield member 402 comprises openings/apertures/through holes formed in the sheet. Thus, ends of first and second inductor coils 124, 126 must first be passed through the apertures before being connected to the PCB 122.

The sheet comprises a first aperture 414 to receive a section of wire forming the first inductor coil 124, where the section of wire includes the first end 130*a*. The sheet also comprises a second aperture 418 to receive a section of wire forming the second inductor coil 126, where the section of wire includes the first end 130*c*. The sheet further comprises a third aperture 416 to receive a second section of wire forming the first inductor coil 124, where the second section of wire includes the second end 130*b*. The sheet also comprises a fourth aperture 420 to receive a second section of wire forming the second inductor coil 126, where the second section of wire includes the second end 130*b*.

The apertures 414, 416, 418, 420 are all offset from each other in a direction along the axis 422 defined by the sheet (and are therefore all offset from each other in a direction along the longitudinal axis 158 defined by the susceptor 132 when the magnetic shield member 302 is in place).

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. An aerosol provision device, comprising:

a receptacle configured to receive aerosol generating material, wherein the aerosol generating material is heatable by a susceptor;

an inductor coil extending around the receptacle, wherein the inductor coil is configured to generate a varying magnetic field for heating the susceptor; and a magnetic shield member extending at least partially around the inductor coil, wherein the magnetic shield member is rolled around the inductor coil and is at least partially bonded to itself.

2. An aerosol provision device according to claim 1, wherein the magnetic shield member is in contact with the inductor coil.

3. An aerosol provision device according to claim 2, wherein the magnetic shield member is bonded to the inductor coil by an adhesive layer.

4. An aerosol provision device according to claim 1, wherein the magnetic shield member comprises at least one magnetic shielding layer and at least one laminate layer.

5. An aerosol provision device according to claim 4, wherein the laminate layer comprises a plastic material.

6. An aerosol provision device according to claim 5, wherein the plastic is Polyethylene terephthalate, PET.

7. An aerosol provision device according to claim 1, wherein the magnetic shield member:

is formed from a sheet; and defines a notch, wherein the notch is configured to receive a section of wire forming the inductor coil.

8. An aerosol provision device according to claim 7, wherein:

the aerosol provision device further comprises a second inductor coil adjacent to the inductor coil;

the sheet defines comprises a second notch; and the second notch is configured to receive a section of wire forming the second inductor coil.

9. An aerosol provision device according to claim 1, further comprising a susceptor, wherein the susceptor defines the receptacle.

10. An aerosol provision device according to claim 1, further comprising an outer cover forming at least a portion of an outer surface of the aerosol provision device, wherein an outer surface of the outer cover is positioned away from an outer surface of the susceptor, and wherein the inductor, the susceptor, and the outer cover are configured such that a temperature of the outer surface remains below about 48° C.

11. A magnetic shield member for an aerosol provision device, wherein the magnetic shield member is formed from a sheet and comprises:

a magnetic shielding layer;

an adhesive layer applied to a first side of the magnetic shielding layer;

a laminate layer applied to a second side of the magnetic shielding layer;

a first notch defined by the sheet, the first notch being configured to receive a section of wire forming a first inductor coil of the aerosol provision device; and a second notch defined by the sheet, the second notch being configured to receive a section of wire forming a second inductor coil of the aerosol provision device.

12. An aerosol provision device, comprising:

a receptacle configured to receive aerosol generating material, wherein the aerosol generating material is heatable by a susceptor;

an inductor coil extending around the receptacle, wherein the inductor coil is configured to generate a varying magnetic field for heating the susceptor; and a magnetic shield member extending at least partially around the inductor coil, wherein the magnetic shield member is rolled around the inductor coil, wherein the magnetic shield member overlaps itself, and wherein the magnetic shield member is at least partially bonded.

13. An aerosol provision device, comprising:

a receptacle configured to receive aerosol generating material, wherein the aerosol generating material is heatable by a susceptor;

an inductor coil extending around the receptacle, wherein the inductor coil is configured to generate a varying magnetic field for heating the susceptor; and a magnetic shield member extending at least partially around the inductor coil, wherein the magnetic shield member is rolled around the inductor coil is at least partially adhesively bonded.

* * * * *